United States Patent [19]
Manrique-Valadez

[11] Patent Number: 5,666,818
[45] Date of Patent: Sep. 16, 1997

[54] SOLAR DRIVEN AMMONIA-ABSORPTION COOLING MACHINE

[75] Inventor: José Angel Manrique-Valadez, Monterrey, Mexico

[73] Assignee: Instituto Tecnologico and de Estudios Superiores, de Monterrey, Mexico

[21] Appl. No.: 580,440

[22] Filed: Dec. 26, 1995

[51] Int. Cl.[6] .............................. F25B 27/00; F25B 33/00
[52] U.S. Cl. ........................................ 62/235.1; 62/497
[58] Field of Search .................................. 62/235.1, 497, 62/476, 148; 165/48.2

[56] References Cited

U.S. PATENT DOCUMENTS

| | | | |
|---|---|---|---|
| 3,407,625 | 10/1968 | McDonald | 62/497 |
| 4,151,721 | 5/1979 | Kumm | 62/6 |
| 4,171,619 | 10/1979 | Clark | 62/235.1 |
| 4,251,997 | 2/1981 | Newton | 62/101 |
| 4,368,623 | 1/1983 | Knoche et al. | 62/235.1 |
| 4,386,501 | 6/1983 | Jaeger | 62/112 |
| 4,429,545 | 2/1984 | Steinberg | 62/235.1 |
| 4,467,623 | 8/1984 | Reimann | 62/476 |
| 4,531,384 | 7/1985 | Paeye | 62/476 |
| 4,573,330 | 3/1986 | van der Sluys et al. | 62/476 |
| 4,744,224 | 5/1988 | Erickson | 62/235.1 |
| 4,750,550 | 6/1988 | Ikematsu et al. | 62/104.12 |
| 4,763,488 | 8/1988 | Johnston | 62/497 |
| 4,966,014 | 10/1990 | Erickson | 62/235.1 |
| 4,993,234 | 2/1991 | Korsgaard | 62/235.1 |
| 5,024,063 | 6/1991 | Erickson | 62/235.1 |
| 5,435,154 | 7/1995 | Nishiguchi et al. | 62/476 |
| 5,544,497 | 8/1996 | Inoue | 62/497 |

*Primary Examiner*—William Doerrler
*Attorney, Agent, or Firm*—A. Thomas S. Safford

[57] ABSTRACT

A cooling machine, useful for air conditioning, refrigeration, ice production, or the like, based on the ammonia absorption thermodynamic cycle, and operated by a heat source of relatively low temperature, as for example a set of solar heat collectors, wherein the generator of said cooling machine comprises a first vessel through which said ammonia solution is circulated and is subject to separation of ammonia from water in the solution by raising its temperature through heat exchange relationship with a stream of a hot liquid, heated in the set of solar collectors; and a second vessel coaxially disposed surrounding said first vessel, whereby the walls of said first and second vessels define an annular hot water circulation chamber; said first vessel having a plurality of staggered series of heat transfer fins of predetermined dimensions so as to optimize the heat transfer from said hot liquid to the ammonia solution in said generator.

12 Claims, 4 Drawing Sheets

SOLAR DRIVEN AMMONIA-ABSORPTION COOLING MACHINE

FIELD OF THE INVENTION

The present invention relates to a cooling machine driven for example by solar energy, useful for air conditioning, refrigeration, ice production, or the like. More particularly, the invention is directed to a device known as a generator forming part of the cooling machine which utilizes an aqueous solution of ammonia as the working fluid in an absorption type refrigeration thermodynamic cycle.

BACKGROUND OF THE INVENTION

The references referred to hereinafter, each of which are hereby incorporated by reference, disclose the state of the art.

Refrigeration machines of the absorption type utilizing ammonia as the refrigerant fluid and water as the absorbent, have been known for many years. These machines have been used for example in household refrigerators and air conditioners and utilize a burner of natural gas or electricity as the source of energy for heating the aqueous solution of ammonia. An example of this type of absorption heat pump, not used for cooling or as a chiller, is described in U.S. Pat. No. 4,573,330 to van der Sluys et al. This patent describes a particular design of generator (integrated to a rectifier) wherein fins are provided internally within the generator vessel to promote the formation of liquid drops. The heat is provided by a burner (63) and is not intended to operate with solar energy or other heat source of low temperature and low heat density, therefore this patent does not teach or suggest in any way a solution to the problem of transferring heat with sufficient efficiency from an energy source, such as a solar collector, to the ammonia solution in the generator.

U.S. Pat. No. 4,744,224 gives as a general background of solar driven ammonia absorption refrigerators. This patent describes an intermittent cycle system where the structure of the solar energy collector functions directly as the generator by day and as the absorber by night. The solar radiation directly heats up the ammonia solution circulating through the solar collector. Although this proposal may seem more efficient than the customary practice of heating water in the collectors and then using said hot water to heat the ammonia solution, it has several drawbacks. For example, it does not make use of commercially available solar collectors, because those commercial collectors would have to be operated at high pressures (approximately 14 bars). Also, implicitly it would require conduits for ammonia of considerable length with the consequent increase in risk of leaks. This system is also limited with respect to the temperature that can be reached by the solution and consequently also with respect to the cooling capacity of the machine as well as in its general operation. A machine operating according to this patent would not work at all if the temperature in the generator is not sufficiently high (of the order of 100° C. when the ambient temperature is about 30° C.); as can be derived from a pressure-temperature diagram for aqueous ammonia solutions.

U.S. Pat. No. 4,763,488 discloses a heat exchanger made of parallel plates, which can be utilized as a generator in an ammonia based solar driven absorption system. The generator structure disclosed in this patent however is of complex manufacture and also has the disadvantage of not fitting in the preferred design of existing refrigeration machines.

The present invention overcomes the disadvantages of the prior art and renders commercially possible the more effective utilization of solar energy for cooling purposes as air conditioning and ice making. One of the main reasons why the solar energy has not been yet widely applied for air conditioning, refrigeration or ice making is that the density of energy available from the sun radiation is very low, therefore, a combination of sufficiently high temperatures and energy density has to be obtained to operate a commercially available cooling machine.

The applicant has found that by combining an ammonia based absorption machine, of the type commercially available, and that has been already optimized both in its thermodynamic process and mechanical components, with a suitable solar collector and a generator modified to incorporate this invention (with little or no change in the size or bulk of the generator), the solar energy can be effectively and efficiently utilized for these purposes. This invention also makes it possible to utilize other low temperature energy sources, as for example waste heat carried by fluid streams in many industrial processes, which heat is usually thrown away to the environment, contributing to thermal pollution.

Many attempts have been made in the past in order to find an effective way of transferring the amount of necessary heat to the ammonia solution and at the same time to reach sufficiently high temperatures in the generator in order to effectively separate the ammonia from the water. The simplest way of combining a solar collector with an absorption cooling machine is to circulate water through a solar collector and then pass the hot water through heat exchange pipes in the generator where the ammonia solution contacts said pipes. This simple combination however does not work because the amount of heat per unit area to be transferred through the heat-exchange pipes can not flow through the practically-available heat transfer area under such conditions.

It is therefore an object of the invention to provide a device useful as a generator in an ammonia-absorption cooling machine which may be operated utilizing relatively low temperature energy sources, and especially which can be used with commercially available components of high-temperature driven cooling machine of the ammonia-absorption type by substituting for the burner unit yet without increasing the size of the generator core.

It is another object of the invention to provide a solar driven ammonia-absorption cooling machine.

Other objects of the invention will be pointed out hereafter or will be evident to those skilled in the art.

The objects of the invention are generally achieved by an apparatus combining a source of low temperature energy, of the type which can heat a liquid to temperatures in the range of 120° C. to 150° C., for example a solar energy collector, and an ammonia-absorption type cooling machine which comprises a generator vessel where an aqueous solution of ammonia is heated to separate absorbed ammonia from the solvent water by a multi-stage equilibrium separation; a hot water circulation vessel, coaxially enclosing at least a portion of and cooperating with said generator vessel to define a hot water circulation chamber through which water is caused to circulate in direct contact with the wall of said generator vessel, thus transferring heat from said hot water to said ammonia solution; characterized by the fact that said generator vessel has a multitude of heat transfer fins protruding into and preferably substantially filling said hot water circulation chamber arranged in staggered series along the wall of said generator vessel so that the hot water circulating in contact with said fins is subject to frequent direction changes resulting in heat transfer enhancing. Without intending to link the effectiveness of the present invention to the following explanation, the applicant believes that the efficiency of the heat transfer fins having the dimensions herein claimed, particularly the length, measured in the direction of the circulation of hot water through said hot water circulation chamber, is effective for this application because the many abrupt changes in direction cause turbulence breaking up establishment of thicker more steady-state boundary layers that inhibit efficient convection heat transfer at the fin surfaces. Said fin length is shorter than the length where the thick steady state boundary layers would be formed by the water circulating straight through said chamber at each side of the heat transfer fins. In other words, as the fins length is increased much beyond 50 mm there is a significent decrease in the heat transfer efficiency thereafter.

BRIEF DESCRIPTION OF THE DRAWINGS

In this specification and in the accompanying drawings, some preferred embodiments of the invention are shown and described and various alternatives and modifications thereof have been suggested; but it is to be understood that other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
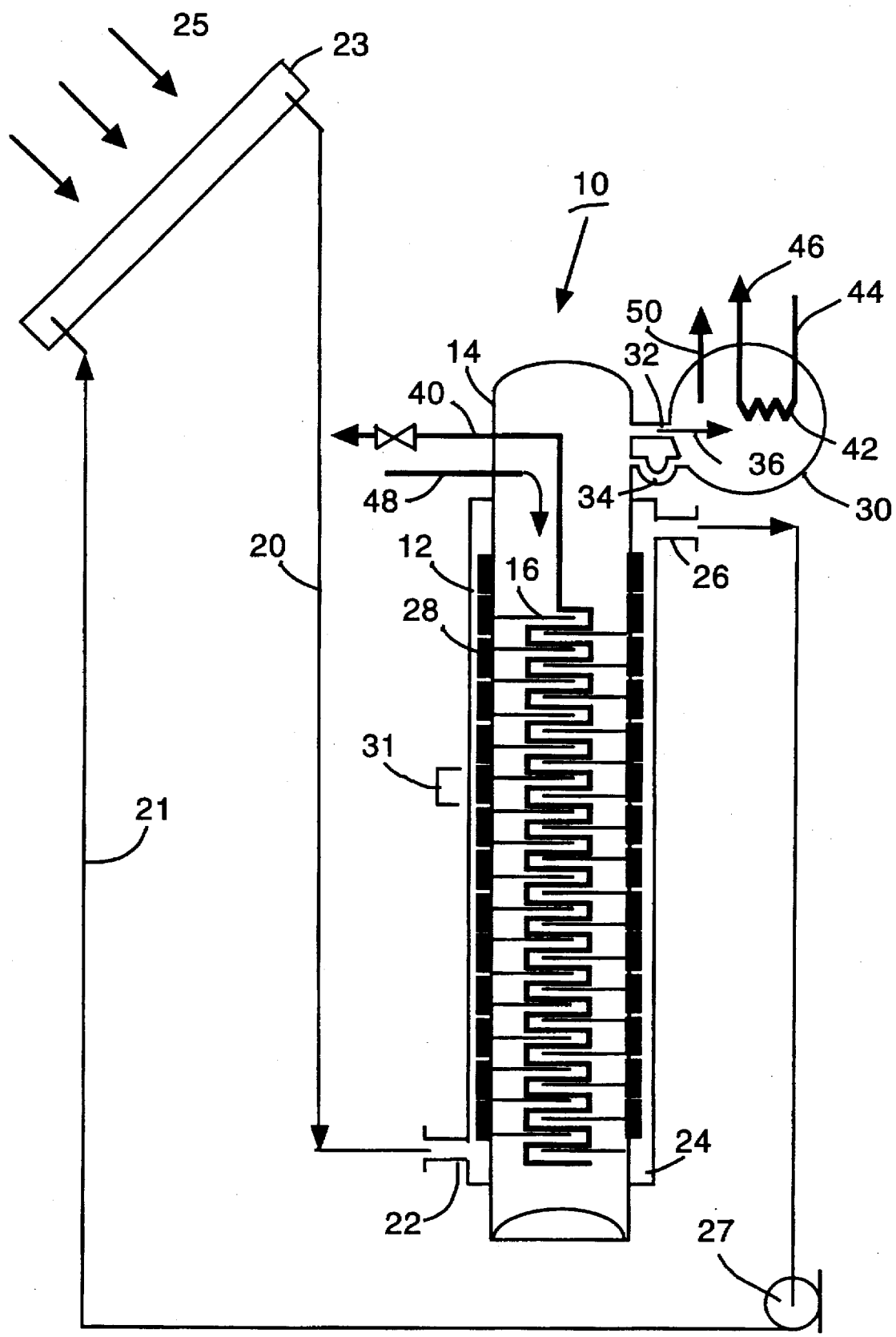
FIG. 1 is a schematic diagram in the vertical section of a generator for a solar based cooling system operating with an aqueous ammonia solution.

Referring first to FIG. 1, the generator is generally designated by numeral 10, and comprises an outer vessel in the form of a water jacket 12, adapted to withstand pressures on the order of about 4 to 6 bars, and an internal vessel forming the generator core 14 provided with a plurality of internal semicircular plates 16 which increase the contact between the heat source and the ammonia solution to promote heating and also facilitate the contact of the vapor phase and the liquid phase of the aqueous ammonia solution wetting the plates thus causing ammonia to better concentrate in the vapor phase.

Liquid water is heated by solar radiation 25 in solar collectors 23 to a temperature in the range between 120° C. and 150° C. From there, it flows via pipe 20 to vessel 12 (entering through inlet 22). The circulating solar-heated water then exits through outlet 26 and flows via pipe 21 by means of pump 27 back to the solar collectors 23 to receive more energy from said solar collectors.

The strong ammonia solution enters the generator core 10 through pipe 48 from the absorber 29 of the cooling machine 9. The solar-heated water circulating through the annular space 24 of the generator water jacket 12 transfers heat from such hot water stream across the wall of generator core 14 to the ammonia solution therein to accomplish the required separation of ammonia from water. The resulting weak ammonia solution exits generator core 14 via pipe 40 to feed the absorber 29 (after first passing through a pressure reducing valve 33, which compensates for the pressure differential between the generator core 14 and the absorber 29). The amount of heat required to separate the required ammonia vapor is of the order of 7000 watts (23886 B.T.U. per hour) per ton of refrigeration (one ton of refrigeration= 3517 watts=12,000 BTU per hour) for a machine to operate satisfactorily. Therefore, the heat transfer area must be on the order of 1.5 square meters, per ton of refrigeration (which surface must be constructed in contact with the vessel wall of the generator core 14, with such wall being dimensioned for the predetermined desired capacity of the cooling machine).

Although many attempts have been made in the past to extend the heat transfer surface of the generator core 14 by means of heat exchange fins, these have not been successful because the characteristics of the heat transfer boundary layer on such fins have not been taken into account. The applicant has found that the heat density required can be effectively transferred by constructing the fins 28 with the following approximate dimensions: length 30 mm to 50 mm; width 12.7 mm to 19.1 mm; and about 2.38 mm to 3.18 mm of thickness. Consequently, the length 31 of the fins in the direction of the hot water flow is shorter than the length where the boundary layers formed by the water circulating through said chamber along the sides of said heat transfer fins meet between adjacent fins. According to the present invention, the heat-transfer fins 28 are arranged in a staggered pattern, as better seen in FIG. 2, so as to present frequent directional changes to the flow of hot water annular space 24, as can be seen in FIG. 3. This arrangement for the heat transfer fins is sufficiently effective to allow for operation of a cooling machine 9 operated by a low temperature heat source as for example solar collectors 23.

The annular space 24 for hot water flow in the claimed generator also has the advantage that the generator jacket 12 can be insulated, so that the heat loss from the hot water is minimized, in contrast with the prior art generators where most of the energy is applied as a direct flame from a gas burner only to the bottom of the generator and the heat content of the products of combustion is carried away by the fumes of the burner.

Figure 4:
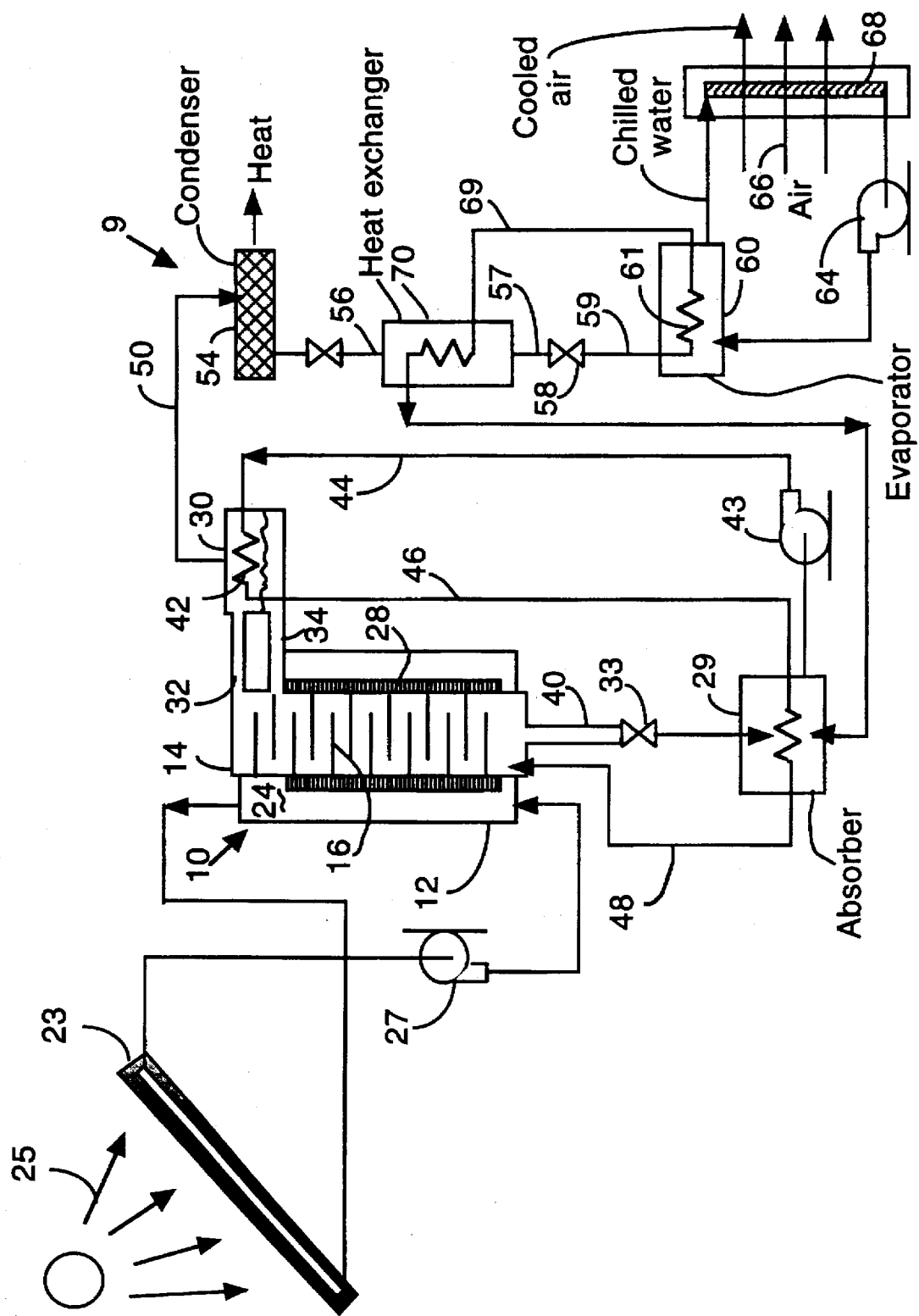
FIG. 4 is a schematic diagram of a preferred embodiment of the cooling machine incorporating the present invention.

As a result of the heating the ammonia solution, the refrigerant vapor, ammonia, rises to the top of the generator core 14. There the vapor 36 enters a leveling chamber 30, through passage 32. A stream of high concentration ammonia solution at a relatively lower temperature of about 45° C. is circulated at high pressure by means of a pump 43 via pipe 44 to coil 42, which latter forms a rectifier zone in said leveling chamber 30. This rectifier zone is simply a heat exchanger. The coil 42 exchanges heat with the refrigerant vapor passing through passage 32. When the hot vapor contacts the cooler coil 42, any water vapor which might have been carried out from the generator core 14 into the leveling chamber 30 will condense and drain to the bottom of said chamber 30 and return to the generator core 30 through the condensate line 34. After the high concentration solution is heated in the rectifier zone 42, it flows to through pipe 46 to the absorber 29 of the cooling machine 9 and leads said strong solution at a higher temperature through pipe 48 into the generator core 14. The refrigerant vapor (ammonia) leaves the rectifier zone via line 50 in chamber 30 at a high pressure and temperature and is circulated through a thermodynamic cycle portion of the cooling machine, as known in the art (a typical example of which is shown in FIG. 4).

More specifically, the high-pressure high-temperature ammonia vapor is passed via pipe 50 to condenser 54 (wherein the vapor is liquified by heat dissipation to the outer environment, e.g. from condenser coils). The liquid ammonia flows via pipes 56 and 57 to expansion valve 58. Cold gaseous ammonia from valve 58, cooled by loss to the heat of vaporization, flows via pipe 59 into the cooling coils 61 of the evaporator 60. There, typically, water circulated in a closed loop 62 by pump 64 is chilled by heat exchange contact with coils 61 and in turn cools air (arrows 66) by heat exchange flow through remote coils 68. The still somewhat cool ammonia gas issuing from the evaporator flows via pipe 69 to the absorber 29 (advantageously through heat exchanger 70) where the low pressure ammonia vapor is absorbed in the weak water-ammonia solution received in the absorber 29 from the generator core 14 via pipe 40 (through pressure reducing valve 33). Pump 43 draws a strong solution from the absorber 29 and delivers that cool solution at high pressure through the rectifying chamber 30 and on via line 46, heat exchange coils in absorber 29, and line 48 to generator core 48.

Figure 2:
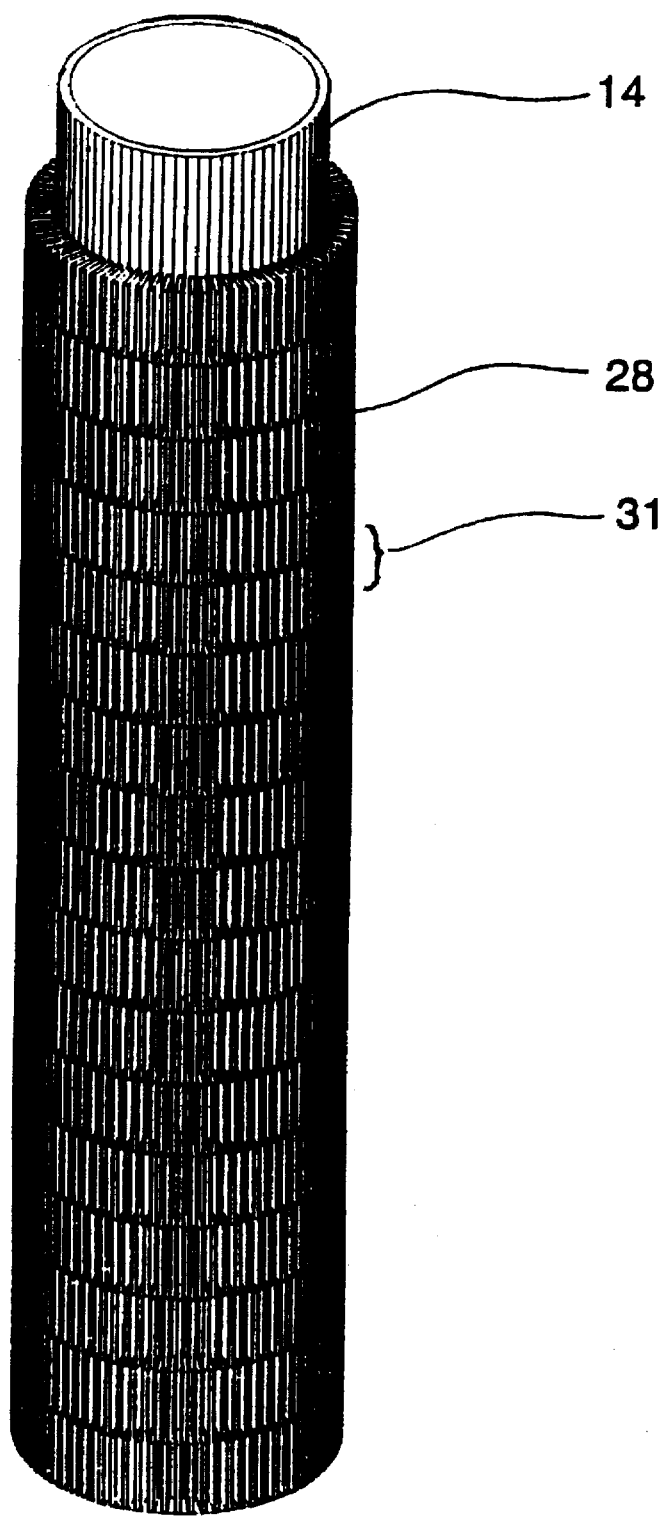
FIG. 2 is a schematic perspective view of the internal vessel of the generator, showing the heat transfer fins according to the present invention.
Figure 3:
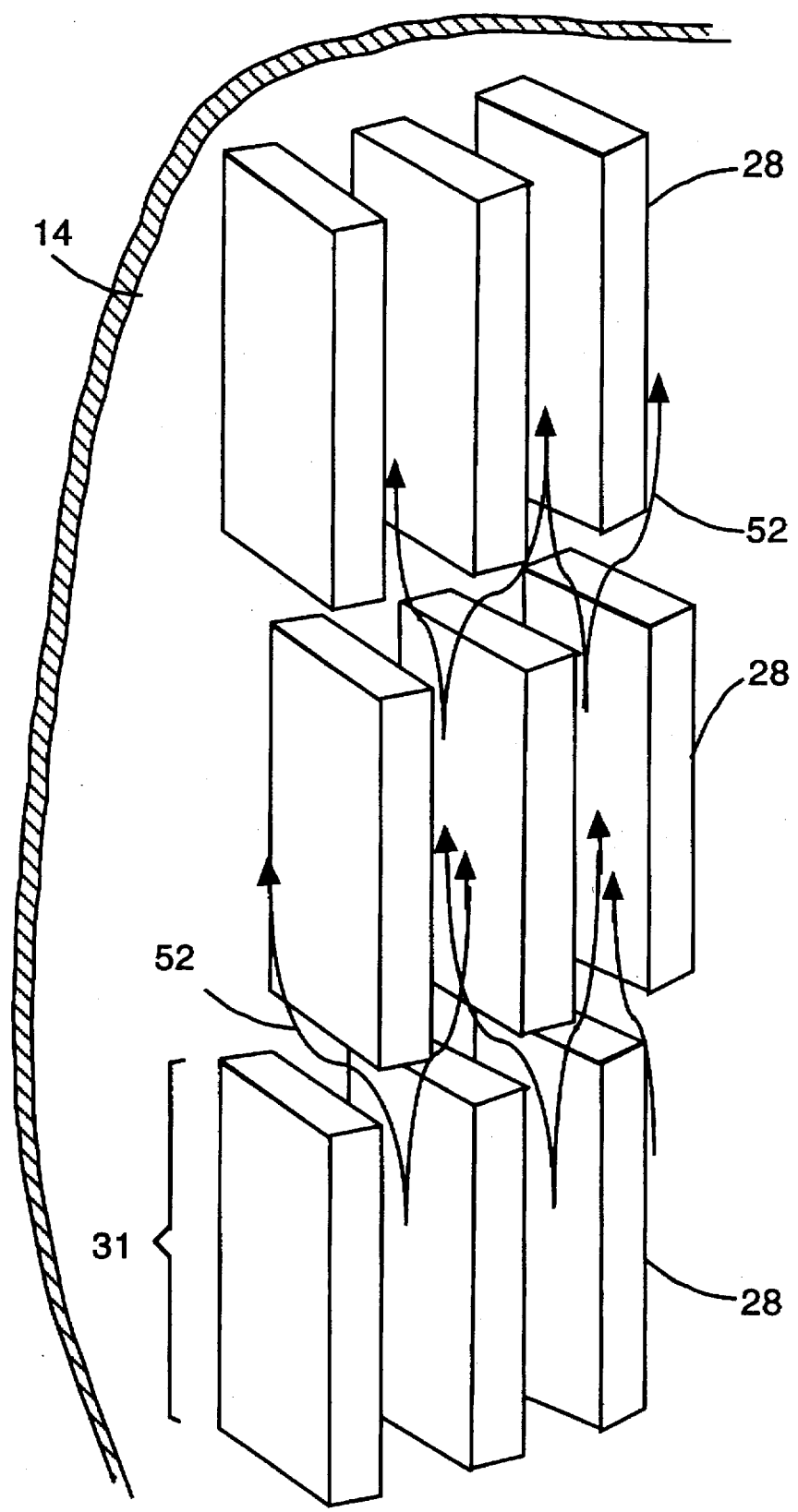
FIG. 3 is a schematic perspective view on an enlarged scale of the structure in FIG. 2 to show the relative disposition of the heat transfer fins.

Referring now to FIG. 2, the generator core 14 is shown in a perspective view illustrating the preferred arrangement of the heat transfer fins 28 which are formed in staggered series surrounding the vessel 14, so that the water circulating through the annular space 24 within the water jacket 12 is in contact with such fins 28 (which latter fill most of such space 24) and thus is subject to frequent changes in the direction of its flow. This detail is more explicitly shown in FIG. 3 where a schematic amplified view of the fins 28 has been illustrated and where the flow of the hot water is indicated by the arrows 52 passing through the spaces between each pair of adjacent fins 28. The fins preferably are oriented radially as illustrated in FIG. 2, in horizontal rows closely spaced and alternatively axially staggered. The array of fins could also be in a wound overlapping spiral and spaced such that such space between adjacent fins is obstructed longitudinally by a fin in the next winding.

The following example of an operating air conditioning machine 9, having a capacity of 3 tons of refrigeration and driven by solar radiation, illustrates the invention:

| Dimensions of fins 28: | length | width | thickness |
|---|---|---|---|
|  | 50 mm | 19.1 mm | 3.18 mm |
| Outer diameter of core 14: | 152 mm | | |
| Inner diameter of water jacket 12: | 195 mm | | |
| Vertical spacing between staggered rows of fins: | 1 mm | | |
| Vertical height of stacked fins (17 rows): | 867 mm | | |

From this it can be seen that the fins 28 substantially fill the annular space 24, leaving about 1/8 inch expansion spacing). The effective length for heat transfer where the boundary layer does not present great resistance to the heat flow from the hot water to the fins, for a hot water flow rate of about 1 liter/sec in a flow annular area of 0.01 square meters measured without the fins, is about 50 mm. This finding makes the construction and operation of a cooling machine 9, having a generator 10 incorporating the invention, of practical use when the energy source is for example heat obtained from solar collectors.

The hot water stream had a temperature of about 145° C. during the operation of the cooling machine 9 of the example and was heated by vacuum solar collectors of the type known as evacuated heat pipes which concentrate solar heat in a stream of water which then heated said hot water stream. The separation of the ammonia is very effective, having only a minimum amount of water in the outgoing stream of about 0.4 % wt. of water in the solution of ammonia exiting the generator. The chiller for chilling water to be used in air conditioning was a modified commercially-available 3 tons absorption unit, and the load was a two-floors experimental house with a total floor area of about 120 square meters. The outside ambient temperature was on the order of 30° C. to 35° C.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive or limitative. Variations and changes may be made by those skilled in the art without departing from the spirit of the invention in its broader aspects, for example the shape of the heat-exchange fins in the generator may be different (non-rectangular, especially if needed for mass production, such as might result from the formation of multiple fins from a continuous metal strip), or the heat for driving the cooling machine may be taken from a hot stream in an industrial process instead of from solar collectors.

What is claimed is:

1. In an air cooled absorption cycle cooling machine adapted to use an aqueous solution of ammonia as the thermodynamic work fluid and having a generator device for separating ammonia vapor from the solution, the improvement in such generator so as to be capable of use with a solar heater or other source of heat of a relatively low temperature capable of heating water to temperatures between 120° C. and 150° C. and of delivering an energy rate above 7000 Watts per ton of refrigeration; comprising a generator core in the form of an elongated tank through which the circulation of ammonia solution is subject to separation of ammonia from solvent water when the solution temperature is raised through heat exchange relationship across a wall of said core with a circulating stream of hot water, a generator jacket coaxially disposed surrounding said core and defining an annular hot water axial-flow circulation chamber; a multitude of closely spaced substantially axially-aligned heat transfer fins having an axial length on the order of 50 mm or less and being mounted on the wall of said generator core, said fins protruding into and substantially filling said annular chamber, any given pair of circumferentially adjacent fins being oriented face-to-face with any such upstream pair being axially obstructed immediately downstream by another similarly-oriented fin being offset in a staggered relation to said pair.

2. An air cooled absorption cycle cooling machine according to claim 1, wherein said fins are radially oriented in an ordered staggered array.

3. An air cooled absorption type cooling machine according to claim 2, wherein the total surface of said heat transfer fins in contact with said stream of hot liquid is above 1.5 square meters per ton of refrigeration of said machine.

4. An air cooled absorption cycle cooling machine according to claim 3, wherein said fins have the following dimensions: 30 to 50 mm of axial length, 12.7 to 19.1 mm of radial width and 2.38 to 3.18 mm of thickness.

5. An air cooled absorption cycle cooling machine according to claim 4, wherein said fins are spaced axially on the order of 1 to 2 mm and circumferentially the spacing is on the same order of magnitude.

6. An air cooled solar driven cooling machine comprising a solar energy collector system capable of heating water to temperatures above 120° C. and deliver an energy rate above 7000 Watts per ton of refrigeration, and an air cooled absorption type cooling machine for using an aqueous solution of ammonia as the thermodynamic work fluid; said cooling machine having a generator comprising a first vessel for heating the ammonia solution by heat exchange relationship with a stream of hot water being at a temperature in the range of 120° C. to 140° C., whereby the ammonia is separated from the solvent water by a multistage equilibrium process; and a second vessel coaxially disposed surrounding said first vessel, wherein the walls of said first and second vessels define an annular hot water circulation chamber; said first vessel having a plurality of staggered series of heat transfer fins contacting the wall of said first vessel on its wall side in contact with the hot water stream; said heat transfer fins being transversely spaced and having a length, measured in the direction of the circulation of hot water through said chamber, which is shorter than that length and spacing of said fins which would otherwise cause the boundary layers formed by the water circulating through said chamber along the mutually facing sides of any pair of adjacent heat transfer fins to meet between said adjacent fins.

7. An air cooled absorption cycle solar driven cooling machine according to claim 6, wherein said solar energy collector system comprises gas evacuated tubes for collecting solar heat in a thermal fluid, and a heat exchanger for heating water with heat from said thermal fluid.

8. An air cooled absorption cycle solar driven cooling machine according to claim 3, wherein said heat transfer fins have a transverse spacing and a length, measured in the direction of the circulation of hot water through said chamber, which is shorter than that length and spacing of such fins which would otherwise cause the boundary layers formed by the water circulating through said chamber along the mutually facing sides of any pair of adjacent heat transfer fins to meet between said adjacent fins.

9. An air cooled absorption cycle cooling machine according to claim 8, wherein said fins are located on substantially the entire surface of the regenerator core within said annular chamber.

10. An air cooled absorption cycle cooling machine according to claim 3, wherein said fin length is shorter than the length where the steady state boundary layers would be formed by the water circulating straight through said chamber at each side of the heat transfer fins.

11. An air cooled absorption cycle cooling machine according to claim 10, wherein said fins are oriented in an ordered staggered array; wherein said fins are spaced axially on the order of 1 to 2 mm and are spaced transversely on the same order of magnitude; and wherein said fins further have the following dimensions: 30 to 50 mm of axial length, 12.7 to 19.1 mm of height, and 2.38 to 3.18 mm of thickness.

12. An air cooled absorption cycle cooling machine according to claim 11, wherein said fins are located on substantially the entire surface of the regenerator core within said annular chamber.

* * * * *